Figure 1:
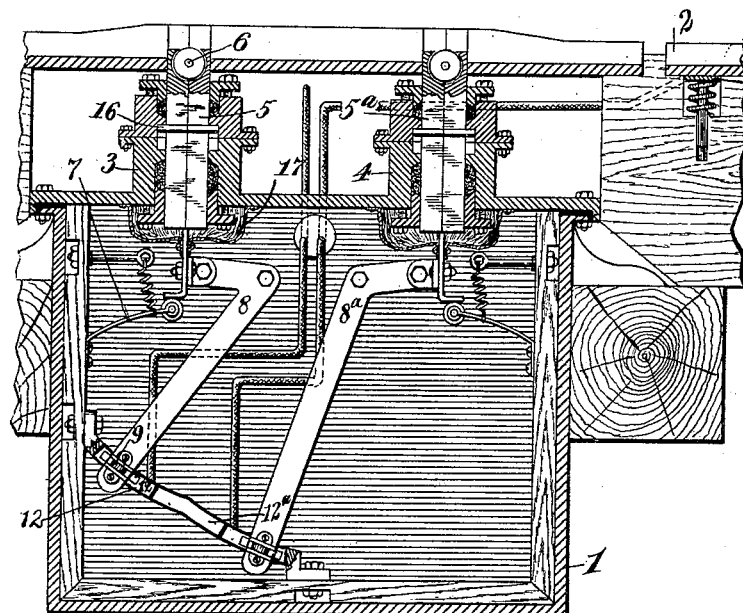

No. 620,852. Patented Mar. 7, 1899.
J. F. MUNSIE.
ELECTRIC RAILWAY.
(Application filed Oct. 25, 1898.)

(No Model.) 2 Sheets—Sheet 1.

WITNESSES:
Geo. B. Rowley.
Elizabeth Ewing

INVENTOR
James F. Munsie
BY Robt. Reid
his ATTORNEY

THE NORRIS PETERS CO., PHOTO-LITHO., WASHINGTON, D. C.

No. 620,852. Patented Mar. 7, 1899.
J. F. MUNSIE.
ELECTRIC RAILWAY.
(Application filed Oct. 25, 1898.)
(No Model.) 2 Sheets—Sheet 2.
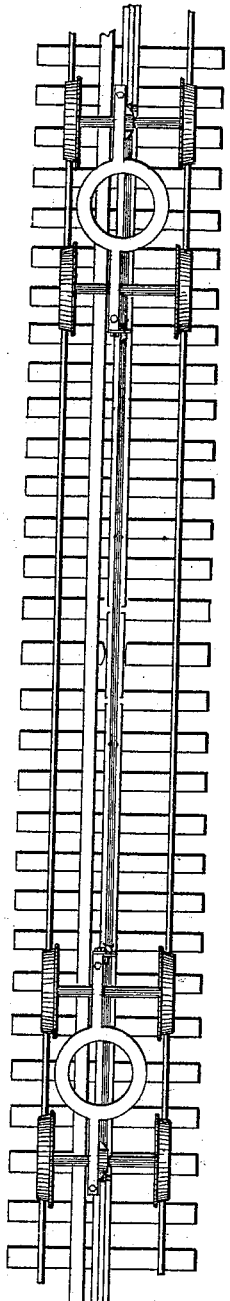
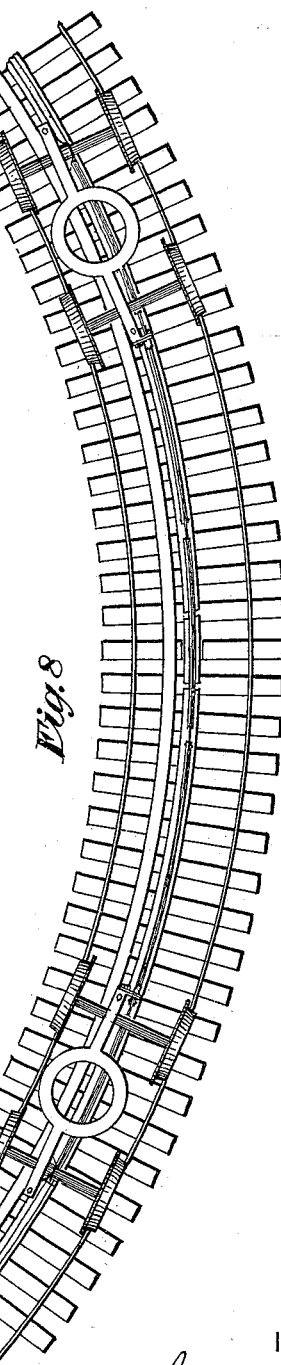
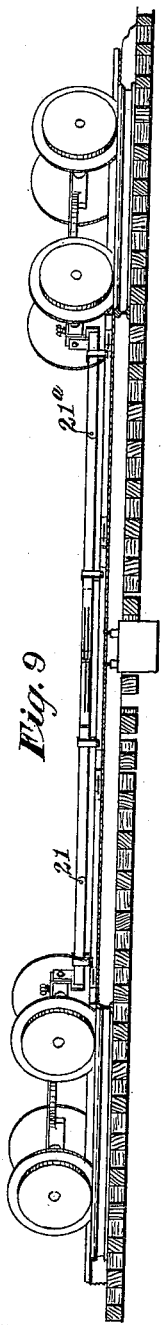
WITNESSES: INVENTOR
BY
his ATTORNEY

UNITED STATES PATENT OFFICE.

JAMES F. MUNSIE, OF NEW YORK, N. Y., ASSIGNOR OF ONE-HALF TO THOMAS L. COLES.

ELECTRIC RAILWAY.

SPECIFICATION forming part of Letters Patent No. 620,852, dated March 7, 1899.

Application filed October 25, 1898. Serial No. 694,504. (No model.)

*To all whom it may concern:*

Be it known that I, JAMES F. MUNSIE, a citizen of the United States, and a resident of New York, (Brooklyn,) in the county of Kings and State of New York, have invented certain new and useful Improvements in Electric Railways, of which the following is a specification.

My present invention relates to electric railways, the object being to provide a system of surface or subsurface supply of current which will be strong, simple in construction, and safe in operation, preventing wasteful leakage of current by short circuits or other causes and will provide an effective mode of supplying current to the traveling cars.

In carrying out the invention I mount between the track-rails a series of contact-boxes containing circuit-closers controlling the supply of current from an insulated supply wire or cable to an insulated rail extending along the track, between the two rails thereof. The boxes are placed at such distances apart as will permit two of them to be simultaneously bridged or engaged by a circuit-controlling device and collector mounted under the car. This device passes along the third rail between the track-rails and is guided in a groove formed in the same, and at points where it passes the contact-boxes it engages two vertically-depressible plungers moving through stuffing-boxes to exclude moisture from the contacts. These plungers are arranged in serial order, so as to be engaged successively by the closing device or contact-shoe mounted on the car and operate circuit-closing levers inside the moisture-proof box. The electric connections are such that the two levers must be simultaneously depressed in order to connect the supply-wire with the grooved rail through which the current-collector moves. Thus it is absolutely necessary, in order that the grooved rail which leads current to the vehicle become alive with current or potential, that an open point between the rail and the supply-wire shall be bridged by two independently movable and controllable devices, and since the chance is remote that both such devices will be simultaneously operated by accidental causes the liability of accident from short circuits is very slight.

In order, however, to provide for such a contingency and especially in elevated-railway systems, I provide at a point at or near the box an independently-operated hand-controlled circuit-breaker, by which the contact with the third rail may be opened by one of the motormen when rendered necessary by a possible short circuit or whenever it should be found desirable to cut out the rail for making repairs. In order to permit the boxes to be as few as possible for a given length of track, I provide a long collector shoe or bar and I provide for the collector properly taking curves in the track by making it flexible and capable of lengthening out or collapsing in order to accommodate itself to the slot on curves. Thus I may use long cars having a great distance between trucks. The plungers where they pass through the box-covers are rendered water-tight by being packed after the manner of a stuffing-box and are connected beneath the cover with a flexible diaphragm of rubber or other waterproof material. These plungers being at no time alive with current under my present system of construction may be made to move accurately in metal boxes, thus insuring safety of operation and a long period of service.

The several features of novelty of the invention will be more particularly hereinafter described and will be definitely indicated in the claims appended to this specification.

Figure 2:
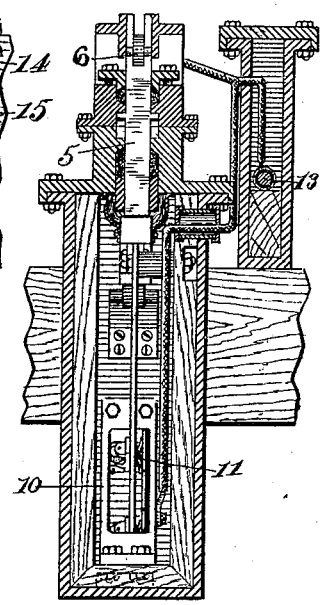
Figure 3:
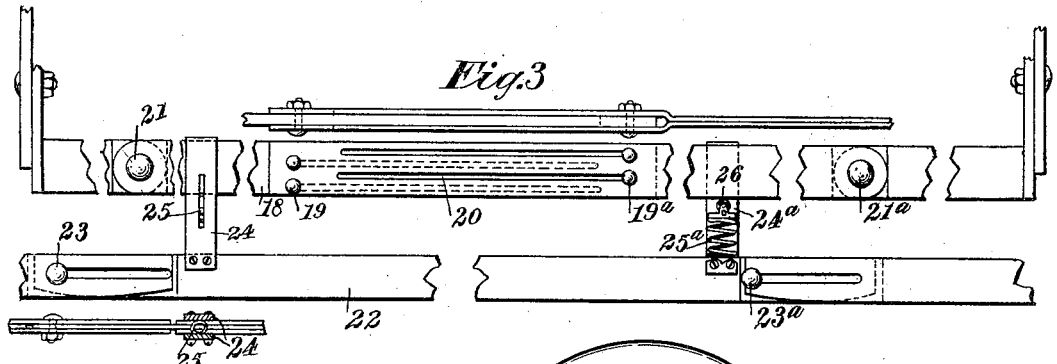
Figure 4:
Figure 5:
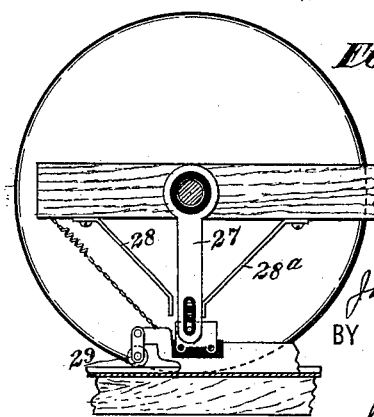

In the accompanying drawings, which illustrate the invention, Figure 1 is a cross-section of a contact-box and supply-rail, taken on a central vertical plane parallel to the line of the track. Fig. 2 is a vertical section on a plane at right angles to that indicated in Fig. 1. Fig. 3 is a detail view of the closing-bar or collector-shoe and its support or vertical adjusting-bar. Figs. 4 and 5 are detail views of the end supports of the collector-shoe. Fig. 6 is a plan, and Fig. 7 a side elevation, of a pair of trucks, showing the manner of mounting the support for the collector-bar on the truck-frames; and Figs. 8 and 9 are similar views to Figs. 6 and 7, showing the condition of the collector-bar and its support on the track-curve.

Referring to the drawings, 1 represents a contact-box firmly anchored on the cross-ties of a railway-track and arranged at determinate intervals along the same. Between these boxes extend grooved rails 2, (seen in section in Fig. 4,) extending from one box to a point adjacent to the next succeeding box, as indicated at the point of junction in Fig. 1. The grooved rails are mounted on wooden stringers. Each length of grooved rail is insulated from the adjoining length and is rendered alive by its own contact-box. The contact-box is preferably lined with wood, the pieces of which may be saturated with fireproof and insulating compound to guard against damage. Upon the wooden lining is supported the operative parts of the circuit-closing device. The cover of the contact-box, which should be well insulated from the body of the box, is provided with two tubular openings 3 4, adapted to form a stuffing-box and guide for a metal plunger, as 5. The plunger is made in two parts divided on a vertical plane, as indicated in Fig. 2, and adapted when brought together to form a journal-bearing for a roller 6. The lower part of the plunger terminates in a plate or bar bearing against a spring-retractor 7 and pivotally connected with an elbow-lever 8, the outer end of which carries a roller 9, moving against a guide 10, fixed on the side of the box. The under side of each lever carries an insulated copper or phosphor-bronze brush 11, adapted to slide upon and form contact with an arc-shaped segment 12 $12^a$. A similar lever $8^a$ is operated by a similarly-controlled plunger arranged in guide 4 on the box.

The segment over which the circuit-closers 8 $8^a$ slide is provided with a central insulated segment. The two outer segments are connected with two cables or electric conductors, as shown in Fig. 1, one of which leads to the supply-cable 13, (see Fig. 2,) buried in a trough-shaped conduit extending along the track, and the other conductor leads to a metal plate 14, secured to a rod 15, and is pressed by a stout spring against the under side of the rail, a sufficient area of contact being given to prevent heating of the parts. A slot is provided in the bar 15 to permit it to be drawn down by a bar or lever inserted through the stringer in which it is supported. Thus when both plungers 5 $5^a$ are depressed the levers 8 $8^a$ bridge the two conductors connected to the outer segments of the arc over which they move and connect them through the center segment, thus forming a continuous electric path from the insulated conductor 13 to the rail 2. The plungers 5 $5^a$ are provided with stuffing-boxes to exclude moisture from the contact-box and have their upward movement checked by a flange 16, bearing against an annular shoulder on the inside of the box formed in the cover of the contact-box. Below the plunger is placed a flexible diaphragm, preferably of soft rubber, as indicated at 17, to permit the necessary motion of the parts and yet establish a water-tight seal at the joint. The joint between the cover and the box is covered with some yielding insulating material, such as asbestos. From the car-trucks is hung an extensible support 18 for the collector bar or shoe. This support is secured to the timbers of the truck, as indicated in Figs. 7 and 8, and is provided at the center of its length with a slip-joint by which it may expand and collapse. More than one of such joints may be employed, if desired. A simple and effective mode of construction is shown in Fig. 3, the upper detached view showing the arrangement in plan. One section of the supporting-bar is bifurcated and straddles the end of its adjoining section, to which it is united by bolts 19 $19^a$, adapted to slide in longitudinal slots, as 20. The supporting-bar is joined to the sections which are fastened to the truck by a pivoted joint, (indicated at 21 $21^a$,) permitting the truck to assume an angle with relation to the bar without disturbing the position of the latter relatively to the grooved rail. On the bar is hung a collector-shoe and current-controlling device 22. This is made in sections, so as to permit it to expand and collapse in a manner somewhat similar to the bar upon which it is supported, slip-bolts 23 $23^a$ (see Fig. 3) being provided at the joints to permit the shoe to yield in a longitudinal direction. I preferably make this bar of three blades of sheet metal, the central one of which may be of phosphor-bronze or other good conductor and the two outer ones, adapted to slip upon the same, of steel. The detail of construction is shown in the lower detached view of Fig. 3. This collector-shoe is hung upon the supporting-bar by yokes or stirrups 24 $24^a$, secured to the collector-shoe and pressed down by coil-springs, as 25 $25^a$, so as to be capable of yielding vertically. These springs engage the supporting-bar by a small roller 26, (see Fig. 3,) which permits the top bar to move readily over the spring. It will be noted that this bar has but one slip-joint, whereas several distributed joints are used in the collector. For purposes of flexibility I prefer to distribute the slip-joints; but in the supporting-bar it is desirable to have it stiff vertically. I therefore form only one slip-joint in this bar. The collector-shoe is mounted so as to be capable of yielding in the line of the track. It is supported at its ends on insulated pivoted arms 27 $27^a$, hung from the truck-frame, the shoe being held down against the grooved rail by a spring mounted on the arm, as indicated. Forward and rear thrust are absorbed by springs 28 $28^a$, &c., secured to the truck-frame. The forward end of the collector-shoe may be provided with a corrugated roller 29, which serves to crush ice or other bodies on the grooved rail and acts as a guide to raise the shoe when the latter approaches the roller 6, raising the shoe clear of the rail by rolling on the inclosed wall of the rail over the contact-box, as seen in Fig. 1. When the corrugated roller passes the plungers 5 5ª, it descends the incline and allows the shoe to smoothly depress the plungers without a violent longitudinal impact thrust.

The operation of the system may now be readily understood. The contact-shoe 22ª enters the groove in the central rail of the truck and is held there in its transit over the track, the joints permitting it to lengthen and shorten to take such curves. When it passes a contact-box, it depresses the plungers 5 5ª and simultaneously operates the two circuit-closing levers in the contact-box, thus completing the circuit from the insulated conductor to the insulated rail from which current is supplied to the collector. When for any reason repairs are required or it is for other reasons necessary to prevent the third rail being rendered alive, the contact with the rail may be opened by moving the spring-controlled pin 15.

On passing a vertical curve in the road-bed, as on rounding the top of a grade, the collector-shoe follows the grooved rail in continuous contact by reason of its distributed joints, and the rounded ends of the sections of the shoe, as seen in Fig. 3, prevent it being raised from the rail or scraping the same by projecting corners.

Having thus described my invention, what I claim as new, and desire to secure by Letters Patent, is—

1. An electric-railway system comprising a series of contact-boxes placed at intervals along the track, each provided with two independently-actuated circuit-closers operated by the transit of a car, coöperating with a collector mounted on the car adapted to hold both circuit-closers closed during transit of a car, and connections for completing the circuit from a supply-conductor extending along the track to the car when both circuit-closers are actuated.

2. An electric railway comprising a series of contact-boxes placed at intervals along the track each containing a water-tight chamber provided with two independently-actuated circuit-closers, separate plungers to operate the same mounted in stuffing-boxes in the box and connections for completing the circuit from a supply-conductor extending along the track to the car through both circuit-closers in series when a car passes over the contact-box.

3. An electric railway comprising a series of contact-boxes placed at intervals along the track, each containing a water-tight chamber provided with two independently-actuated circuit-closers, grooved rails connecting the several boxes, a contact-shoe and collector mounted on the car adapted to traverse the grooved rail, plungers packed water-tight in the top of each box, and connections for completing the circuit through both circuit-closers in series from an insulated supply-rail when a car passes a box.

4. An electric-railway system comprising a series of contact-boxes placed at intervals along the track each containing two independently-actuated circuit-closers for establishing electric connections through both in series with an insulated supply-conductor on transit of a car over the track, and a flexible contact-shoe carried by each car yieldingly mounted for vertical movement and adapted to lengthen and shorten longitudinally of the track to accommodate itself to curves in the track.

5. An electric-railway system comprising a series of contact devices placed at intervals along the track and containing circuit-closers for establishing electric connections with an insulated supply-conductor on transit of a car over the track, a flexible contact-shoe carried by each car adapted to lengthen and shorten longitudinally of the track to accommodate itself to curves in the track, and an extensible support therefor on which the shoe is elastically supported for vertical movement, said support being mounted on the car-trucks.

6. An electric-railway system comprising a series of contact-boxes at determinate points along the track containing circuit-closing devices to establish connections with a supply-conductor, a circuit-operating device carried by each car composed of a support secured to the two car-trucks, and a sectional collector-shoe hung thereon and movable relatively thereto, said shoe being composed of several lengths connected by slip-joints movably pressed together by springs.

7. An electric-railway system comprising a series of contact-boxes at determinate points along the track containing circuit-closing devices to establish connection with a supply-conductor, a grooved rail extending along the track, a circuit-operating device carried by each car composed of a support secured to the car-trucks formed in sections connected together by slip-joints, and a sectional flexible collector-shoe hung thereon and movable relatively thereto, said shoe being formed in sections connected together by slip-joints and adapted to follow the groove in the rail along the track.

8. An electric-railway system comprising a series of contact-boxes at determinate points along the track containing circuit-closing plungers in each box to establish connection with a supply-conductor, a grooved rail extending along the track, divided into insulated sections corresponding to the contact-boxes, a contact-shoe carried by each car carrying a pivoted roller to engage the side walls of the rail-groove, and inclined walls at the sides of the groove at each box to raise the shoe from the plungers until the forward end of the shoe has passed them and then permit engagement with the plungers.

9. A contact-box for an electric-railway system provided with two independent circuit-closers actuated at different positions of a traveling car and coöperating with a collector on the car adapted to hold both circuit-closers closed during transit of the car, and connections between a contact point or space in the track and an insulated supply-conductor normally open at two points in said box, said points adapted to be closed by the joint operation of the two circuit-closers.

10. A contact-box for an electric-railway system provided with two vertical elastically-supported plungers, as 5, 5ª, independent circuit-closers operated thereby, and two normally open breaks between an insulated supply-conductor and a supply-rail closed by the respective circuit-closers.

In testimony whereof I have hereunto subscribed my name this 24th day of October, A. D. 1898.

JAMES F. MUNSIE.

Witnesses:
ELIZABETH EWING,
ALICK G. MACANDREW.